United States Patent [19]

Nanba et al.

[11] Patent Number: 5,793,128
[45] Date of Patent: Aug. 11, 1998

[54] ENCODER AND MOTOR WITH AN ENCODER

[75] Inventors: Katsuhiro Nanba, Okazaki; Yasuhiro Matsumoto, Toyokawa, both of Japan

[73] Assignee: Minolta Co., Ltd., Osaka, Japan

[21] Appl. No.: 620,807

[22] Filed: Mar. 28, 1996

[30] Foreign Application Priority Data

Mar. 31, 1995 [JP] Japan ................. 7-075286

[51] Int. Cl.⁶ ................................... H02K 41/00
[52] U.S. Cl. ........................... 310/12; 310/68 B
[58] Field of Search ................... 310/12, 13, 14, 310/68 B; 318/135

[56] References Cited

U.S. PATENT DOCUMENTS

| | | | |
|---|---|---|---|
| 3,829,746 | 8/1974 | Van et al. | 318/135 |
| 4,574,756 | 3/1986 | Ito et al. | 123/357 |
| 5,010,262 | 4/1991 | Nakagawa et al. | 310/12 |
| 5,225,725 | 7/1993 | Shiraki et al. | 310/12 |
| 5,523,941 | 6/1996 | Burton et al. | 318/135 X |

FOREIGN PATENT DOCUMENTS

| | | |
|---|---|---|
| 53-147219 | 12/1978 | Japan. |
| 62-207168 | 9/1987 | Japan. |
| 2-65656 | 3/1990 | Japan. |
| 5-15138 | 1/1993 | Japan. |

*Primary Examiner*—Thomas M. Dougherty
*Assistant Examiner*—Judson H. Jones
*Attorney, Agent, or Firm*—Burns, Doane, Swecker & Mathis, LLP

[57] ABSTRACT

An encoder for a motor provided with a field magnet as well as the motor having the encoder, wherein the encoder includes an optical and/or mechanical encoder scale formed in an overlapped manner at said field magnet, and a scale reading sensor corresponding to said encoder scale.

19 Claims, 3 Drawing Sheets

ENCODER AND MOTOR WITH AN ENCODER

BACKGROUND OF THE INVENTION

1. Field of the Invention

The present invention relates to an encoder and an electric motor provided with an encoder.

2. Description of the Background Art

In a field where an electric motor is used to drive a mechanical mechanism, it is often required to perform one or more of detection of position of a driven member, i.e., member to be driven, detection of a travel distance, control of a speed and others. These have been required in many fields, and specifically in office automation instruments such as a copying machine, an image scanner and a printer, factory automation equipments such as an X-Y table and an article transferring device, and optical instruments such as a camera.

In order to comply with the above request, measurement has been performed as follows. When the motor is a rotary motor, a rotor shaft is provided with an externally extended portion, and a device such as an encoder disk or a tachogenerator is mechanically attached to the extended portion via a coupler for measuring a rotation state of the motor. When the motor is a linear motor, a linear encoder scale parallel to a stator is arranged outside a movable piece or part of the motor, and a scale reading sensor is arranged so as to move together with the movable piece, so that the state of movement of the movable piece can be measured.

In some of motors to be operated only at a constant rotation speed, a magnetic encoder scale is arranged at a surface of a drive magnet of a stator, and a magnetic sensor corresponding to the scale is arranged at a rotor for detecting a rotation speed.

However, in the structures where the encoder disk or tachogenerator is coupled to the externally extended rotor shaft of the rotary motor, or the linear encoder scale is arranged outside the movable piece of the linear motor, and, in other words, in the structures where the detection portion, i.e., portion to be detected of the encoder is arranged outside the motor, it is necessary to provide an additional space for arranging the detection portion. Also, the detection portion must be positioned accurately, and thus may not be positioned accurately, so that the state of movement of the motor may not be detected accurately.

In the above rotary motor which includes the magnetic encoder scale at the surface of the drive magnet of the stator for detecting the rotation speed, a magnetic signal wave generated from the scale of the encoder contains an offset component under the influence of the drive magnet. Therefore, it is necessary to provide a high-pass filter for removing it. Further, only the rotation at a constant speed is taken into consideration, so that it is impossible to comply with the case where the driven member is driven at a variable speed. Moreover, it is liable to be affected by another magnetism around the motor. In order to suppress the influence by the drive magnet, it may be envisaged to reduce a magnetic flux density of the magnet at a portion for arranging the magnetic encoder scale. However, even this cannot ensure sufficient detection in some cases.

SUMMARY OF THE INVENTION

Accordingly, an object of the invention is to provide such an encoder that does not require an additional space outside a motor for arranging an encoder, and thus can reduce a required space, that has a simple structure but can accurately detect the state of movement of the motor without being affected by other magnetism applied from a drive magnet of the motor and others, and that a variable-speed operation of the motor can be detected when a driven member to be driven by the motor is adapted to be driven at a variable speed. The object of the invention is also to provide a motor provided with such an encoder.

In order to achieve the above object, the invention provides an encoder for a motor provided with a field magnet, comprising an optical and/or mechanical encoder scale formed in an overlapped manner at the field magnet, and a scale reading sensor corresponding to the encoder scale. The invention also provides a motor with such an encoder.

The encoder according to the invention may be an optical encoder, a mechanical encoder or both of them. The motor according to the invention may be a linear motor or a rotary motor.

The optical encoder scale formed in an overlapped manner at the drive field magnet may be typically formed of two kinds of portions which attain different light reflection states and are arranged alternately to each other. These two kinds of portions may be selectively formed of various kinds of portions such as portions having a high light reflectance and a low light reflectance, and can be exemplified more in detail as follows.

(1) Concave and convex portions having different light reflectances (e.g., concave and convex portions of different light reflectances, or concave and convex portions of different light reflecting directions). In this case, the concave and convex portions may form a sinusoidal section, a triangular wave section or the like.

(2) Two kinds of portions having different light reflectances set by adjusting surface roughnesses.

(3) Two kinds of portions having different light reflectances set by film formation such as printing, paint coating or the like (e.g., two kinds of portions having different light reflectances or refractivities, or dark and light portions).

Further, it may be envisaged to attach additionally a scale member in a film form, sheet form, plate form or the like, which is repetitively provided with portions of high and low light reflectances (e.g., selected from the above items (1) to (3)), to the field magnet by overlapping the same to the field magnet by adhesive or the like. In a structure where the optical scale is directly formed, e.g., by mechanical processing, at the portion having the field magnet, the scale can be arranged accurately. Meanwhile, in the structure where the scale is additionally (i.e., subsequently) attached to the field magnet, such an advantage can be achieved that combination of the field magnet and the scale pitch can be selected from a wide range.

In any case, the scale reading sensor corresponding to the above optical scale may include a projection light source for lighting the encoder scale, and a light sensor such as a photocell sensing the light reflected by the encoder scale. In this scale reading sensor, the magnitudes of intensity of the received light provide a pitch of the scale.

The mechanical encoder scale formed in an overlapped manner at the drive field magnet may be typically provided with concavities and convexities arranged alternately to each other to form a sinusoidal section, a triangular wave section or the like. This can be exemplified more in detail as follows.

(1) A scale provided with concavities and convexities, which are arranged alternately to each other to form a sinusoidal section, a triangular wave section, a square wave section or the like, by effecting mechanical processing on a member on which a field magnet is to be formed or has been formed.

(2) A scale provided with concavities and convexities, which are arranged alternately to each other to form a sinusoidal section, a triangular wave section, a square wave section or the like, by effecting printing, paint coating or the like on a member on which a field magnet is to be formed or has been formed.

In addition to the foregoing, it may be envisaged to form the mechanical scale by additionally attaching the scale member of a film form, sheet form, plate form or the like, which is provided with alternately arranged concavities and convexities (e.g., alternately arranged concavities and convexities at the above item (1) or (2)), and is overlapped and attached to the field magnet by adhesive or the like.

In a structure where the mechanical scale is directly formed, e.g., by mechanical processing, at the portion having the field magnet, the scale can be arranged accurately. Meanwhile, in the structure where the scale is additionally attached to the field magnet, such an advantage can be achieved that combination of the field magnet and the scale pitch can be selected from a wide range.

In any case, the scale reading sensor corresponding to the above mechanical scale may include a movable member, which is in contact with and movable with respect to the scale and can move (e.g., can vertically reciprocate) correspondingly to the concavities and convexities of the scale, and sensing means such as a photo-interrupter sensing the motion of this movable member.

All the encoders formed of combination of the scales and scale reading sensors exemplified above are of an increment type. However, the invention may provide an encoder of an absolute type, for example, by employing an optical scale or a mechanical scale of an absolute type.

According to the encoder of the invention and the motor with the encoder, the optical and/or mechanical encoder scale formed in an overlapped manner at the field magnet for driving the motor provide information, which is sensed by the scale reading sensor corresponding to the scale for detecting the state of movement of the motor, so that the result of detection can be used for controlling the operation of the motor. Further, the state of movement of the motor can be detected even in such a case that the set drive speed of the motor is changed to drive a driven member to be driven by the motor at a variable speed.

In the encoder according to the invention, the encoder scale is formed in an overlapped manner at the field magnet, and the scale reading sensor is arranged at the motor itself, so that a space outside the motor is not required for arranging the encoder, which reduces the required space.

Since the encoder is of the optical and/or mechanical types, it is not affected by other magnetism from the field magnet and others, which enables accurate detection.

The encoder does not require a high-pass filter in the conventional rotary motor, and the encoder scale is formed in an overlapped manner at the field magnet. These features allow simplified structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
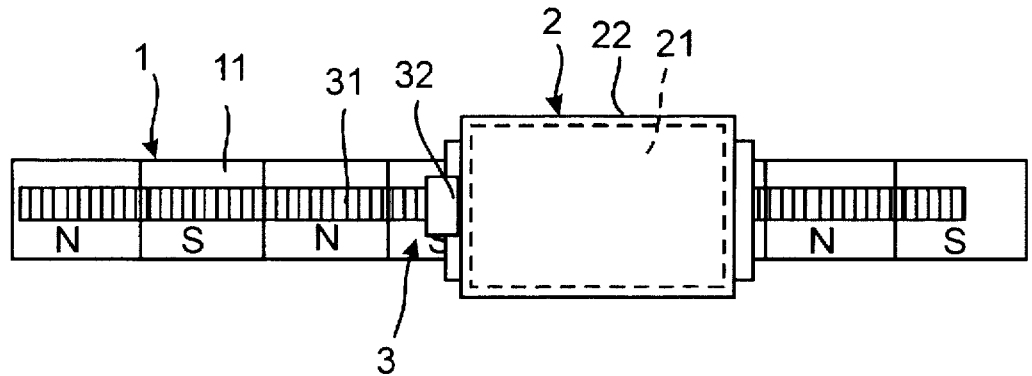
FIG. 1(A) is a plan showing an example of an electric motor with an encoder according to the invention.

Embodiments of the invention will be described below with reference to the drawings. FIG. 1(A) is a plan showing an example of an electric motor provided with an encoder according to the invention, FIG. 1(B) is a side view of the motor, and FIG. 1(C) is a schematic perspective view of the encoder part in the motor.

Figure 1B:
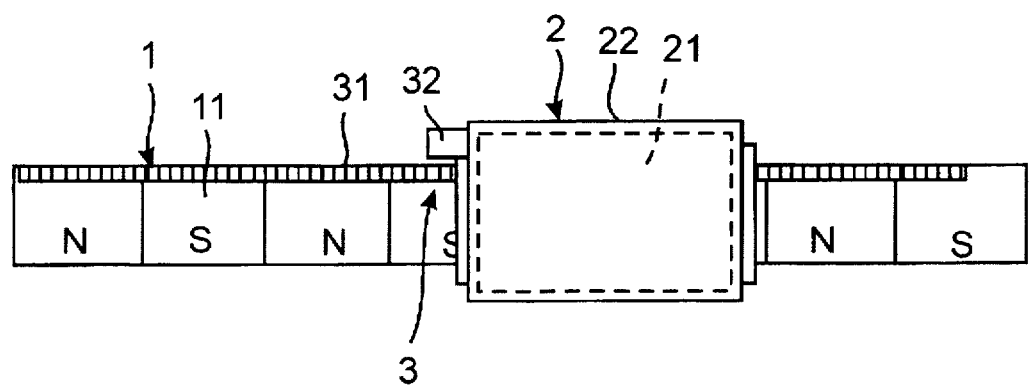
FIG. 1(B) is a side view of the motor.
Figure 1C:
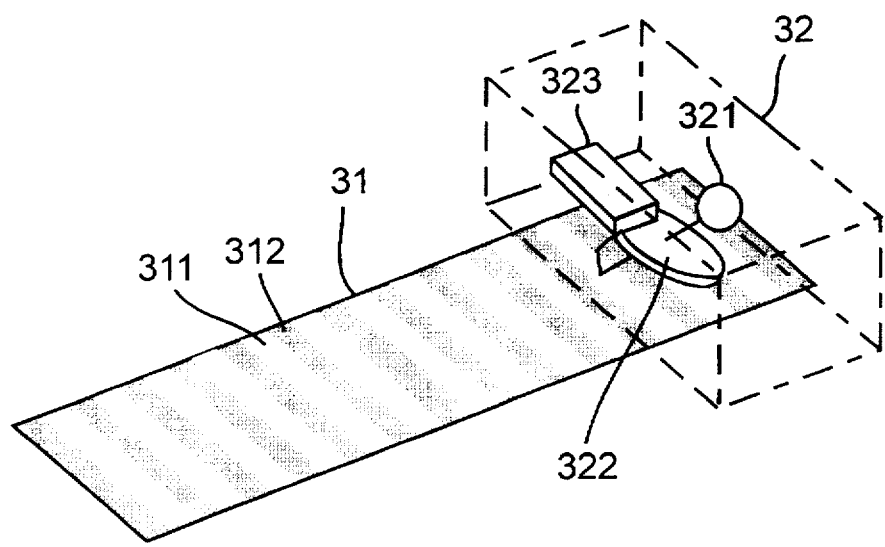
FIG. 1(C) is a schematic perspective view of the encoder part in the motor.

The motor shown in FIGS. 1(A) and 1(B) is a linear motor of a shaft type. The motor is provided with a rod-like stator 1 and a movable piece 2 which is movably carried on and driven along the stator 1.

The stator 1 of a rod-like form includes a field magnet 11 for propelling or driving the movable piece 2, which extends in a uniform direction and has alternately arranged N- and S-poles, and is provided with an optical encoder scale 31 formed in an overlapped manner at the field magnet 11.

The movable piece 2 includes an armature coil 21 fitted around the rod-like stator 1 with a predetermined space therebetween, and a cylindrical movable yoke 22 covering the coil 21. A scale reading sensor 32 which is a component of an encoder 3 is mounted on the movable yoke 22.

Thus, the encoder 3 is formed of the optical scale 31 on the field magnet 11 and the sensor 32 mounted on the movable piece 2.

The optical scale 31 is prepared by mechanical processing the material of the stator 1, and is formed of portions 311 of a high light reflectance and portions 312 of a low light reflectance, which are arranged alternately to each other. The optical scale is not restricted to the above structure, as already described.

The sensor 32 is adapted, as shown in FIG. 1(C), to operate in such a manner that light beams from a light source 321 are collimated by a lens 322 to project the same to the scale 31, and a photocell 323 receives light beams reflected by the scale 31. Magnitudes of the intensity of the light received by the photocell 323 form the pitch of the scale 31.

According to the electric motor described above, a drive force is generated when a current is supplied to the armature coil 21 of the movable piece 2 under the current control, so that the movable piece 2 is driven along the stator 1. The sensor 32 senses information supplied from the optical encoder scale 31 formed in an overlapped manner at the motor driving field magnet 11, and thus senses the state of movement of the motor. The result of this sensing can be used for controlling the operation of the motor.

If the encoder scale is planar, detection can be performed accurately, and collision thereof with the movable piece is suppressed, so that the durability of the encoder is improved. The structure in which a plane portion is formed at a substantially cylindrical stator for arranging the encoder scale may be formed by partially cutting a peripheral surface of a column into a plane, or by forming a longitudinally extending projection having a flat top surface or a longitudinally extending groove having a flat bottom surface.

Figure 2A:
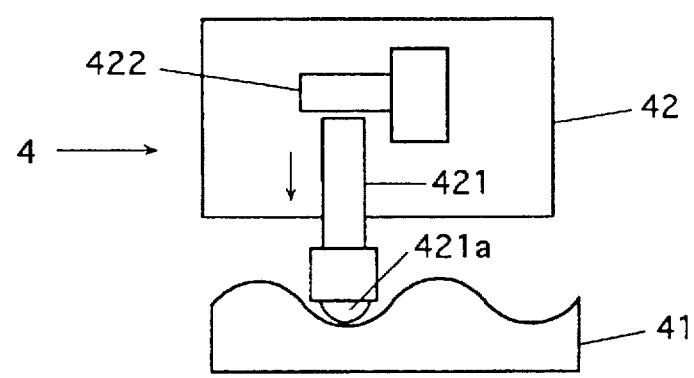
FIGS. 2(A) and 2(B) show schematic structure and operation of an encoder part of another example of a motor with an encoder according to the invention.
Figure 2B:
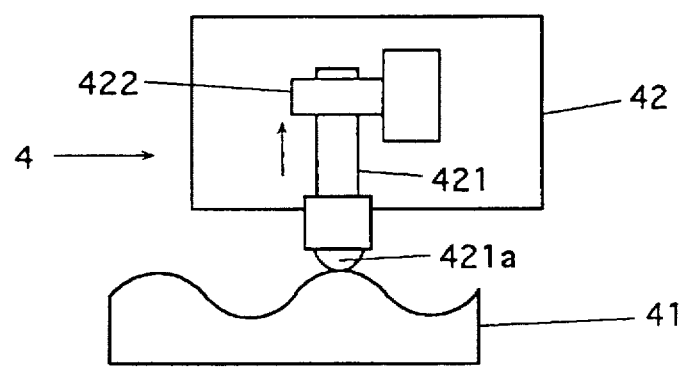

Description will now be given on an example which is a linear motor similar to the motor shown in FIGS. 1(A) and 1(B), and employs a mechanical encoder. Since structures of this motor other than the encoder part are the same as those of the motor shown in FIG. 1, the same structures are not illustrated in the figure and will not be described below. An encoder 4 of this motor is shown in FIGS. 2(A) and 2(B).

The encoder 4 includes a mechanical encoder scale 41 formed in an overlapped manner at the field magnet 11 of the motor stator 1, and a scale reading sensor 42 mounted on the motor movable piece 2.

The scale 41 in this embodiment is prepared by mechanically processing the material of the stator 1 to form concavities and convexities sinusoidally. The mechanical scale is not restricted to this structure, as already described.

The sensor 42 includes a movable member 421 rotatably supporting at its tip end a ball 421a which is in contact with the irregular surface (i.e., concave and convex surfaces) of the scale 41, and also includes a photo-interrupter 422.

According to this encoder 4, when the ball 421a of the movable member 421 is in contact with the scale concavity as shown in FIG. 2(A), the movable member 421 entirely lowers and thus does not intersect the photo-interrupter 422. When it comes in contact with the scale convexity as shown in FIG. 2(B), the movable member 421 entirely rises to intersect the photo-interrupter 422. In this manner, the surface irregularities of the scale 41 are sensed by the photo-interrupter 422.

Also in this motor with this encoder, therefore, the state of movement of the motor can be detected by the encoder 4, and the result of sensing can be used for controlling the operation of the motor.

Figure 3A:
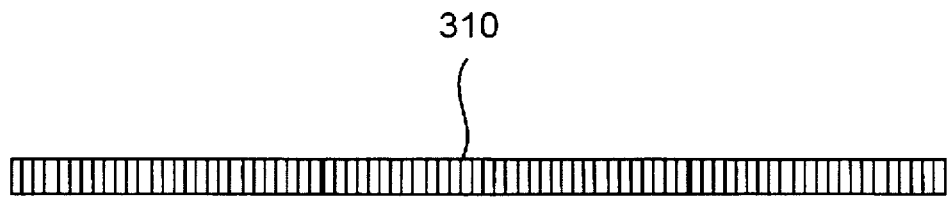
FIG. 3 (A) is a plan of an encoder scale to be attached to an field magnet in a later step.
FIG. 3(B) is a plan of a linear motor stator provided with the scale attached thereto.
FIG. 3(C) is a perspective view of a rotary motor stator provided with the scale attached thereto.
Figure 3B:
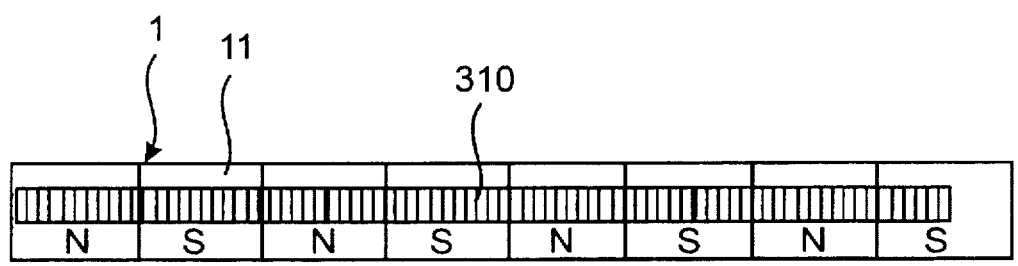
Figure 3C:
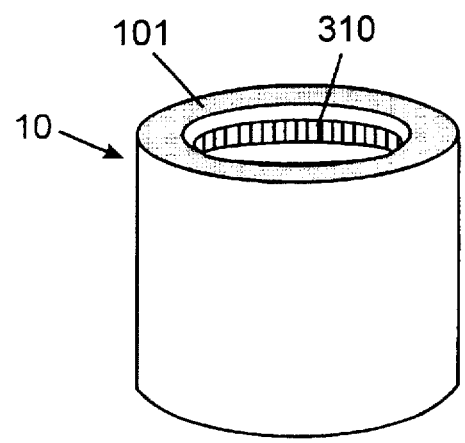

The above embodiments are provided with the encoder scale directly formed in an overlapped manner at the field magnet. Alternatively, as shown in FIG. 3(A), an optical or mechanical encoder scale 310 may be formed independently and attached onto the field magnet 11 of the stator 1 of the linear motor by adhesive or the like, as shown in FIG. 3(B). Further, as shown in FIG. 3(C), the encoder scale 310 may be attached to an inner peripheral surface of the drive magnet 101 of the stator 10 of the rotary motor by adhesive or the like, and a scale reading sensor corresponding to this scale 310 may be arranged. In this embodiment, the scale 310 is in a form of a flexible film band.

If the encoder scale is additionally attached in a later step as described above, combination of the field magnet and encoder scale pitch can be selected from a wide range.

In the motors of the embodiments described above, the encoder scales 31, 41 and 310 are formed in an overlapped manner at the field magnets 11 and 101, and the scale reading sensors 32, 42 and others are arranged at the motors themselves, so that an additional space outside the motor is not required for arranging the encoders 3, 4 and others, which can reduce the required space.

Since each of the encoders 3 and 4 is an optical or mechanical encoder, it is not affected by magnetism of the field magnet 11, 101 or others, and thus accurate sensing can be performed.

The encoders 3 and 4 do not require a high-pass filter in a conventional rotary motor, and the encoder scales 31, 41 and 310 are formed in an overlapped manner at the field magnets, which can also simplify the structures.

Even in such a case that the driven members to be driven by these motors are adapted to operate at variable speeds, these encoders can comply with the variable speed for sensing the scale information.

The motors of the above embodiments each employ either the optical encoder or the mechanical encoder. However the motor according to the invention may employ both of them.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An encoder for a motor provided with a field magnet, comprising:
   an optical and/or mechanical encoder scale formed in an overlapped manner at said field magnet, the encoder scale located within the magnetic field of the field magnet; and
   a scale reading sensor corresponding to said encoder scale;
   wherein said encoder scale is provided with concavities and convexities arranged alternately to each other to form a sinusoidal section.

2. The encoder according to claim 1, wherein said encoder scale is formed of portions having a high light reflectance and portions having a low light reflectance arranged alternately to each other.

3. The encoder according to claim 2, wherein said scale reading sensor includes a projection light source for lighting said encoder scale, and a light sensor for sensing the light reflected by said encoder scale.

4. The encoder according to claim 1, wherein said scale reading sensor includes a movable member being in contact with and movable correspondingly to said concavities and convexities of said encoder scale, and sensing means for sensing the motion of said movable member corresponding to said concavities and convexities.

5. The encoder according to claim 4, wherein said movable member rotatably carries a ball at its tip end, and said ball is in contact with said encoder scale.

6. The encoder according to claim 1, wherein said encoder scale is formed by overlapping and attaching a scale member to said field magnet in a later step.

7. A motor provided with an encoder, said encoder comprising:
   an optical and/or mechanical encoder scale formed in an overlapped manner at a field magnet of the motor, the encoder scale located within the magnetic field of the field magnet; and
   a scale reading sensor corresponding to said encoder scale;
   wherein said encoder scale is formed by overlapping and attaching a scale member to said field magnet in a later step.

8. A linear motor comprising:
   a rod-like stator having a driving field magnet extending in a uniform direction;
   an optical encoder scale formed in a overlapped manner at said field magnet, the encoder scale located within the magnetic field of the field magnet;
   a movable piece including an armature coil and carried by said stator for motion along said stator; and
   a scale reading sensor carried by said movable piece and corresponding to said encoder scale.

9. The linear motor according to claim 8, wherein said movable piece includes a movable yoke covering said armature coil, and said scale reading sensor is mounted on said movable yoke.

10. The linear motor according to claim 8, wherein said encoder scale is formed of portions having a high light reflectance and portions having a low light reflectance arranged alternately to each other.

11. The linear motor according to claim 10, wherein said scale reading sensor includes a projection light source for lighting said encoder scale, and a light sensor for sensing the light reflected by said encoder scale.

12. A linear motor comprising:

- a rod-like stator having a driving field magnet extending in a uniform direction;
- a mechanical encoder scale formed in an overlapped manner at said field magnet the encoder scale located within the magnetic field of the field magnet;
- a movable piece including an armature coil and carried by said stator for motion along said stator; and
- a scale reading sensor carried by said movable piece and corresponding to said encoder scale.

13. The linear motor according to claim 12, wherein said movable piece includes a movable yoke covering said armature coil, and said scale reading sensor is mounted on said movable yoke.

14. The linear motor according to claim 12, wherein said encoder scale is provided with concavities and convexities arranged alternately to each other to form a sinusoidal section.

15. The linear motor according to claim 14, wherein said scale reading sensor includes a movable member being in contact with and movable correspondingly to said concavities and convexities of said encoder scale, and sensing means for sensing the motion of said movable member corresponding to said concavities and convexities.

16. The linear motor according to claim 15, said movable member rotatably carries a ball at its tip end, and said ball is in contact with said encoder scale.

17. The linear motor according to claim 8, wherein the encoder scale is positioned directly between the stator and the movable piece.

18. The linear motor according to claim 8, wherein the encoder scale is located within the drive magnetic field.

19. The linear motor according to claim 8, wherein the encoder scale includes a surface facing the movable piece.

* * * * *